United States Patent [19]
Eberhardt

[11] Patent Number: 5,195,170
[45] Date of Patent: Mar. 16, 1993

[54] NEURAL-NETWORK DEDICATED PROCESSOR FOR SOLVING ASSIGNMENT PROBLEMS

[75] Inventor: Silvio P. Eberhardt, Pasadena, Calif.
[73] Assignee: The United States of America as represented by the Administrator of the National Aeronautics and Space Administration, Washington, D.C.
[21] Appl. No.: 744,042
[22] Filed: Aug. 12, 1991
[51] Int. Cl.⁵ ............................................. G06F 15/18
[52] U.S. Cl. ...................................... 395/24; 395/11; 395/23
[58] Field of Search .................... 395/24, 11, 27, 23; 364/402

[56] References Cited

U.S. PATENT DOCUMENTS

| | | | |
|---|---|---|---|
| 3,134,017 | 5/1964 | Burhans et al. | 364/402 |
| 4,660,166 | 4/1987 | Hopfield | 364/807 |
| 4,866,645 | 9/1989 | Lish | 364/602 |
| 5,016,188 | 5/1991 | Lan | 395/24 |
| 5,047,655 | 9/1991 | Chambost et al. | 395/24 |

OTHER PUBLICATIONS

Majani, et al., "On the K-Winners-Take-All Network," Advances in Neural Network Information Systems 1, D. Touretzky, ed., pp. 634–642, Palo Alto, Calif., Morgan Kaufman Publishers, Inc. 1989).
Brown, et al., "Neural Network Design of a Banyan Network Controller," IEEE Journal of Selected Areas in Communication, vol. 8, No. 8, pp. 1428–1438, (1991).
Moopenn, et al., "A Neural Network for Euclidian Distance Minimization," Proc. IEEE, Intl. Conf. on Neural Networks, vol. II, pp. 349–356, San Diego, Calif., Jul. 24–27, (1988).
J. Munkres, "Algorithms for the Assignment and Transportation Problems," Journal of the Society for Industrial Applications of Mathematics, vol. 5, No. 1, pp. 32–38, (1957).
S. Blackman, "Multiple-Target Tracking with Radar Applications," Artech House Inc., Norwood, Mass., pp. 397–403, (1986).
Hopfield, et al., "Neural Computation of Decisions in Optimization Problems," Biol. Cybern., 52:147–152, (1985).
Tagliarini, et al., "A Neural-Network Solution to the Concentrator Assignment Problem," Proc. IEEE Conf. on Neural Information Processing Systems-Natural and Synthetic (1988).
Kirkpatrick, et al., "Optimization by Simulated Annealing," Science, vol. 220, pp. 670–680, (1983).
Bilbro, et al., "Optimization by Mean Field Annealing," Advances in Neural Information Processing Systems 1, Touretzky, ed., Morgan, Kaufman Publishers, Inc., pp. 91–98, (1989).
Peng, et al., "A Connectionist Model for Diagnostic Problem Solving," IEEE Trans. on Systems, Man and Cybernetics, vol. 19, No. 2, pp. 285–289, (1989).
Saeckinger, et al., "A Versatile Building Block: The CMOS Differential Difference Amplifier," IEEE J. Solid-State Circuits, SC-22, No. 2, pp. 287–294, Apr. 1987.
Lazzaro, et al., "Winner-Take-All Networks of O(N) Complexity," Technical Report Caltech-CS-TR-2-1-88, California Institute of Technology 1988.
Analog Devices, "1990/91 Linear Products Databook," Analog Devices, Inc., 1990, p. 4–61.
Hillier et al., Introduction to Operations Research, Fourth Edition, Holden-Day, Inc., 1986, p. 217.

Primary Examiner—Allen R. MacDonald
Attorney, Agent, or Firm—John H. Kusmiss; Thomas H. Jones; Guy M. Miller

[57] ABSTRACT

A neural network processor for solving first-order competitive assignment problems consists of a matrix of N×M processing units, each of which corresponds to the pairing of a first number of elements of $\{R_i\}$ with a second number of elements $\{C_j\}$, wherein limits of the first number are programmed in row control superneurons, and limits of the second number are programmed in column superneurons as MIN and MAX values. The cost (weight) $W_{ij}$ of the pairings is programmed separately into each PU. For each row and column of PUs, a dedicated constraint superneuron insures that the number of active neurons within the associated row or column fall within a specified range. Annealing is provided by gradually increasing the PU gain for each row and column or increasing positive feedback to each PU, the latter being effective to increase hysteresis of each PU or by combining both of these techniques.

10 Claims, 6 Drawing Sheets

FIG. 7 VARIABLE GAIN ANNEALING

FIG. 8 VARIABLE FEEDBACK ANNEALING

NEURAL-NETWORK DEDICATED PROCESSOR FOR SOLVING ASSIGNMENT PROBLEMS

ORIGIN OF THE INVENTION

The invention described herein was made in the performance of work under a NASA contract, and is subject to the provisions of Public Law 96-517 (35 USC 202) in which the contractor has elected not to retain title.

TECHNICAL FIELD

The invention relates to a neural-network processor for solving global optimization problems, and more particularly to solving first-order assignment problems such as resource allocation problems, scheduling of segmented data cells queued at input terminals of an asynchronous transfer mode (ATM) telecommunication switching, and other first-order assignment problems.

BACKGROUND ART

A neural-network architecture for competitive assignment requires that elements of two sets (e.g., resources and targets) be associated with each other so as to minimize the total cost of the associations. It is assumed that all pairwise costs of associating an element of one set with an element of the others are given. Such an assignment is a class of global optimization problems that pose a computational bottleneck in a number of computation-intensive real-time systems. In the assignment paradigm, members of one set $\{R_i; 1 \leq i \leq M\}$ (e.g., resources) are to be assigned to members of another set $\{C_j; 1 \leq j \leq N\}$ (e.g., consumers or targets). An assignment is denoted by a binary matrix $X = \{x_{ij}\}$, where $x_{ij} = 1$ if $R_i$ is associated with $C_j$ and $x_{ij} = 0$ otherwise. The total cost of a selected assignment is given by $$\text{COST}_{TOTAL}(X) + \sum_{i=1}^{M} \sum_{j=1}^{N} W_{ij} x_{ij} \tag{1}$$

where $W_{ij}$ is the pairwise assignment cost matrix. Assignments are not arbitrary; "blocking" constraints specifying the number of elements of $\{C_j\}$ that may be associated with each element $R_i$, and the number of elements of $\{R_i\}$ that may be associated with each $C_j$ are given as well. While one-to-one blocking constraints are most commonly encountered, some applications require one-to-several or several-to-several associations. Thus, the assignment problem is to choose an assignment $X$ that minimizes $\text{COST}_{TOTAL}(X)$ and satisfies the blocking constraints.

From a circuit implementation standpoint, the traditional additive neural network for assignment requires a two-dimensional matrix of neurons referred to hereinafter as processing units, PUs, and therefore the connection matrix requires a third dimension. As current VLSI technology is essentially two-dimensional, only small additive networks may be implemented on standard die sizes, and even nonstandard technologies such as wafer-scale implementations and chip stacking may limit N and M to a hundred or so. Larger problem sizes require a reformulation of the network model to reduce connectivity. The new architecture presented below has only a few times more connections than PUs and is compatible with VLSI implementation. Means have been developed for applying association costs, satisfying blocking constraints, forcing PUs to hypercube corners and implementing annealing.

A constraint on the number of elements of $\{R_i\}$ that may be associated with $C_j$ is equivalent to a constraint on the number of activated PUs in column j of the PU matrix. Similarly, constraints on the number of elements of $\{C_j\}$ associated with $R_i$ specify how many PUs may be on in row i. Focusing on a single row, a circuit that forces only one neuron to turn on, thus enforcing a one-to-one assignment, is the winner-take-all (WTA). The WTA, via mutual inhibition, allows only the PU with the maximum input excitation to become activated; all other PUs are turned off. The WTA model has been extended to allow multiple winners in the k-WTA formulation of Majani, et al., "On the k-winners-take-all network," Advances in Neural Information Systems 1, D. Touretzky, ed., pp. 634-642, Palo Alto, Calif., Morgan Kaufman Publishers, Inc. (1989).

While the k-WTA would allow each $R_i$ and $C_j$ to be associated with a programmable number $k_i^R$ or $k_j^c$ of elements of the other set, the new architecture presented below has generalized the method one step further to allow elements to be independently associated with a range or window of elements of the other set. The resulting function, the k,m-WTA, uses the variable pair (k,m) to specify the minimum and maximum number of associated elements. By setting k=m, the k-WTA one-to-several association function is obtained, and by setting k=m=1, one-to-one association may be specified. obtained, and by setting k=m=1, one-to-one association may be specified.

Each row and each column is connected using the k,m-WTA. The question whether these multiply overlapping winner-take-all circuits can still function correctly was addressed by Brown and Liu, "Neural network design of a Banyan network controller," IEEE Journal of Selected Areas in Communication, Vol. 8, No. 8, pp. 1428-1438, (1991), who found that WTA and k-WTA circuits still function correctly when overlapped arbitrarily. Note, however, that it is possible to specify inconsistent blocking constraints which cannot all be satisfied simultaneously. Letting $(k_i^R, m_i^R)$ and $(k_j^c, m_j^c)$ be the row and column constraints (MIN, MAX), respectively, a necessary condition for consistency is $$\sum_{i=1}^{M} k_i^R \leq \sum_{j+1}^{N} m_j^c \text{ and } \sum_{i+1}^{M} m_i^R \geq \sum_{j=1}^{N} k_j^c. \tag{2}$$

The association costs $W_{ij}$ are distributed throughout the interconnection matrix. A key to the present assignment architecture is that association costs are subtracted locally from the input PUs representing the assignments, Moopenn, et al., "A neural network for euclidian distance minimization," Proc. IEEE, Intl. Conf. on Neural Networks, Vol. II, pp. 349-356, San Diego, Calif., Jul. 24-27, (1988). This tends to inhibit PUs with a high association cost while pushing PUs with low energy costs towards activation. Consequently, low-cost assignment configurations are favored by the k,m-WTA circuits. processor can be designed with connections only along rows and columns of a matrix of PUs (to implement the k,m-WTA) and a few global connections to all PUs.

The complexity of the assignment problem may be understood by considering that for sets of N and M elements, the number of possible solutions satisfying one-to-one (and in some cases one-to-zero) blocking constraints is N!/(N-M)!, assuming N≥M. Because the problem requires a global solution, it cannot be decomposed without risk of losing the optimal solution. Nevertheless, when fast solutions are required, the problem is generally solved either by decomposition or limited best-fit search. Search algorithms that find optimal solutions include Munkres' method which has a computational complexity of $O(MN^2)$. See J. Munkres, "Algorithms for the assignment and transportation problems," Journal of the Society for Industrial Applications, of Mathematics, Vol. 5, No. 1, pp. 32–38, (1957) and S. Blackman, Multiple-Target Tracking with Radar Applications, Artech House Inc., Norwood, Mass., pp. 397–403, (1986). While more efficient than exhaustive enumeration, such algorithms remain computation-intensive, requiring seconds or minutes of processing on powerful computers. These methods are therefore not suitable for many real-time applications. Furthermore, for problems with one-to-several and several-to-several blocking constraints, the number of possible solutions can be considerably larger and no known efficient search algorithms exist. Practical applications that fit into this assignment paradigm are detailed below.

In the military domain, an obvious and time-honored application is weapon-target association. Of particular importance is neutralization of intelligent missiles, which have attained a position of primary importance among munitions in today's military defense tactics. In many cases, the time between threat detection and countermeasure deployment is on the order of seconds, so the automated detection and decision-making components of a defense system must be highly optimized for speed, especially if humans are in the loop as well. In an idealized situation, the various threats are identified and the most appropriate countermeasures applied. Indeed, it may be necessary to allocate several disparate countermeasures to the more serious threats, or perhaps in some cases several threats may be dealt with by one defensive system. Consequently, the traditional one-to-one assignment paradigm is no longer adequate.

Another application is radar tracking of aircraft (e.g., at large airports) or missiles (e.g., ICBM tracking as a component of Strategic Defense Initiative systems). In order to track individual objects from a swarm of tens or hundreds, "blips" from successive radar sweeps must be matched. An alternative approach is to use Kalman filters to estimate the bearing and velocity of the individual objects and to assign the instantaneous estimated positions to the actual positions determined by radar.

Finally, an application that is becoming increasingly important as computer and national telecommunication networks convert to the transmission of information (e.g., audio, fax, video) by discrete units of digital data, is high-speed network packet switching. Within a communications network the function of a switching node can be viewed as an assignment of node inputs to node outputs. The blocking constraints require that at any one time each input is assigned to one output vice versa. The switch may have additional constraints if there is no direct path from each input to each output. The cost of assigning an input to an output depends on whether or not the input has data waiting for that output. Cumulative latency time and packet priority may need to be taken into account as well. The assignment paradigm developed in this application is compatible with a switching network having maximal throughput and near-optimal delay.

Traditionally, global optimization problems of this competitive assignment type have been solved by computationally exhaustive searches where the number of computations increases as the cube of the number of resources. The computational load may be reduced by heuristic means, but in that case the solution is not guaranteed to be optimal or even good.

A means for overcoming the limitations in computation speed imposed by serial digital computers is parallel processing, whether digital or analog. One possible method for solving assignment problems is based on massively parallel analog computation using neural networks.

Figure 1:
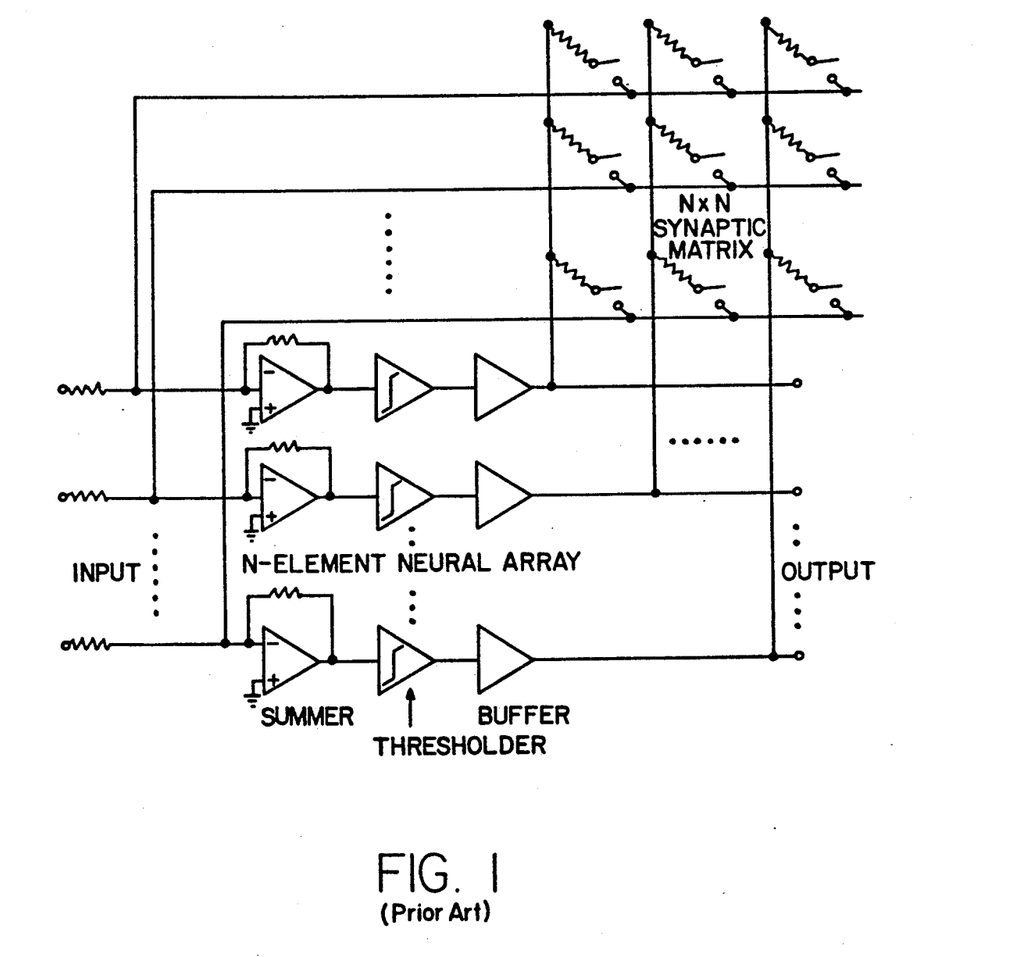
FIG. 1 illustrates schematically a prior-art Hopfield feedback neural network.

The neural network architecture that has received the most attention for solving optimization problems is the Hopfield network described by Hopfield and Tank, "Neural computation of decisions in optimization problems," Biol. Cybern, 52:147–152, (1985). This architecture, shown in FIG. 1, consists of an array of processing operational amplifiers (called neurons but generally referred to herein as processing units) interconnected fully via a matrix of connecting elements of programmable strength (called synapses). The connection strengths of the synapses are variable and it is these weight variables that determine the behavior of the neural network.

With few exceptions, neural network applications have been mapped onto the additive networks by first formulating a Lyapunov function that has energy minima which correspond to the desired solutions. Typically, this "energy equation" is composed of simple quadratic terms each of which is minimized when a particular application constraint is satisfied. From this equation, the interconnection weight matrix is then derived by a simple transformation. An alternative approach is to use heuristics to implement required constraints directly.

The system must be configured such that only as many PUs can be active in each row or column as allowed by the blocking constraints, and association costs must be incorporated such that as the system settles, or relaxes, the better solutions have a competitive advantage over the other. The PUs apply a nonlinear saturating function to the sum of input signals. When they are allowed to take on an analog range of values, as would generally be the case in hardware implementations, the solution space takes the form of an MN-dimensional hypercube, the corners of which correspond to the assignment decisions. To form a complete, unambiguous solution X, all PUs must relax to saturated "on" and completely "off" states.

This additive network has been used for solving, by computer simulation, the concentrator assignment problem, a one-to-several assignment problem in which multiple elements of the one set (named "sites") are matched with each element of the other set (named "concentrators"), as described by Tagliarini and Page, "A neural-network solution to the concentrator assignment problem," Proc. IEEE Conf. on Neural Information Processing Systems—Natural and Synthetic (1988). One application of this problem is selecting how goods should be distributed from a number of warehouses to a chain of retail outlets scattered in a geographic area encompassing the warehouses, such that total transport distance is minimized. Capacities of the individual concentrators were programmed by allocating $k_i$ additional "slack" neuron rows to the basic assignment matrix. The energy function used was $$E = a \sum_{i=j}^{M} \left( \sum_{j=1}^{M} V_{ij} - 1 \right)^2 + \quad (3)$$

$$b \sum_{j=1}^{M} \left( \sum_{i=1}^{M+k_j} V_{ij} - k_j \right)^2 + c \sum_{i=1}^{M} \sum_{j=1}^{M+k_j} V_{ij}(1 - V_{ij})$$

where $k_j$ gives the maximum number of elements supported by concentrator j. From this Lyapunov function, the required weights for satisfying the blocking and neuron on/off constraints were derived. The association costs were heuristically added to the resulting interconnection matrix. In a series of 100 trials of a small 5×12 problem, the network never found the optimal solution, but all solutions were within 0.3% of optimal, and most within 0.01%, so it was concluded that the network effectively rejected poor solutions. While solutions of this quality are quite satisfactory for some applications, the problem size was very small. Of concern is whether more realistic problem sizes would result in solutions as good. Also, consider the connectivity complexity for this architecture. If $k_{max}$ is the largest expected $k_i$ then the number of connections is $O(M^2(M + k_{max})^2)$. Such extensive connectivity would pose serious difficulties for hardware implementations.

"Simulated annealing" is one means to improve the quality of solutions found by such competitive optimization architectures, as described by Kirkpatrick, Gelatt and Vecchi, "Optimization by simulated annealing," Science, Vol. 220, pp. 670-680, (1983). Traditionally, annealing involves injecting uncorrelated noise into each neuron and gradually reducing the level of the noise according to an annealing schedule. This has the effect of exciting the system out of local minima in the energy surface and into deeper minima corresponding to better solutions.

An alternative method of annealing, known as "mean-field annealing" is described by Bilbro, et al., "OPTIMIZATION BY MEAN FIELD ANNEALING" *Advances in Neural Information Processing Systems* 1, Touretsky, ed., Morgan, Kaufman Publishers, Inc., pp. 91-98 (1989) and is especially appealing for hardware implementations. It can be implemented by gradually increasing the slope of the saturating neuron function in the presence of a small level of fixed noise. Application of that annealing to significantly improve the solutions found by competitive optimization architectures is reported by Peng and Reggia, "A connectionist model for diagnostic problem solving," IEEE Trans. on Systems, Man and Cybernetics, Vol. 19, No. 2, pp. 285-289, (1989).

Initially, a method for "resettling" the network was used in which multiple production operations were performed in order to reduce the probability of obtaining a poor solution. With the incorporation of simulated annealing, the network produced quite good solutions to small-scale problems without resettling.

STATEMENT OF THE INVENTION

The classical one-to-one and one-to-several (or several-to-one) assignment problems may be mapped onto a summing architecture by allocating an NxM matrix of neurons, referred to hereinafter as "processing units" (PUs) or more simply as "units," to a first set of resource elements $R_N$ and a second set of consumer or target elements $C_M$, such that each set $R_N$ element $R_i$ corresponds to one row in the matrix and each set $C_M$ element $C_j$ to one column. For a one-to-one assignment problem, every PU of the matrix thus represents a unique pairing of one element of the set $\{R_i\}$ with one element of the set $\{C_j\}$, or equivalently, one entry of the assignment matrix X. For a one-to-several or several-to-one assignment problem, every PU of the matrix represents a pairing of one element of the set $\{R_i\}$ with several elements of the set $\{C_j\}$, or several elements of $\{R_i\}$ with one element of the set $\{C_j\}$. For a several-to-several assignment problem, which is also possible, every PU represents a pairing of one element of the set $\{R_i\}$ with several elements of the set $\{C_j\}$, and vice-versa, in which case the matrix of PUs may need to be rectangular rather than square.

Thus, in accordance with the present invention, a neural network processor for solving first-order competitive assignment problems consists of a matrix of NxM processing units, each of which corresponds to the pairing of a first number of elements of $\{R_i\}$ with a second number of elements $\{C_j\}$, wherein limits of said first number are programmed in row control superneurons as MIN and MAX values, and limits of said second number are programmed in column superneurons as MIN and MAX values. The weight of the pairings is programmed separately into each of the PUs. For each row and each column of PUs, a dedicated constraint superneuron implementing the k,m-WTA function insures that the number of active neurons within the associated row or column fall within a specified range. These constraint superneurons are individually programmed with the minimum and maximum number of row or column neurons that may be active. If the actual number of active PUs is outside of this range, the row or column superneuron alters an excitatory signal that is presented in parallel to the PUs of that row/column, with the effect that additional PUs are turned on or off to comply with the programmed range.

Annealing is provided by gradually increasing the PU gain for each row and column or increasing positive feedback within each PU, the latter being effective to increase hysteresis of each PU or some combination of one or both of these techniques with other known techniques for annealing. The result is a control of the settling of the PUs to a final stable solution in which some PUs are turned on, specifying that the corresponding association should be made, and some are turned off, specifying that it should not be made. It is the stable pattern of on and off PUs that gives the solution to the programmed problem.

DETAILED DESCRIPTION OF THE INVENTION

It should be noted that the implementation described below differs in several respects from the Hopfield network. While it cannot be used to solve higher-order optimization problems, such as the traveling salesman problem, it can be used to perform resource allocation in an efficient manner with respect to circuit complexity. The architecture differs from the Hopfield network in that the interconnections are sparse, all have unit weight, and the programmable variables are stored in explicit memory cells rather than being distributed throughout a synaptic matrix. In addition, means for annealing may be readily provided. Finally, constraints are programmed via separate column and row superneurons that apply excitation and inhibition signals to the neuron cells. Such structures are not implicit in the Hopfield network.

Figure 2:
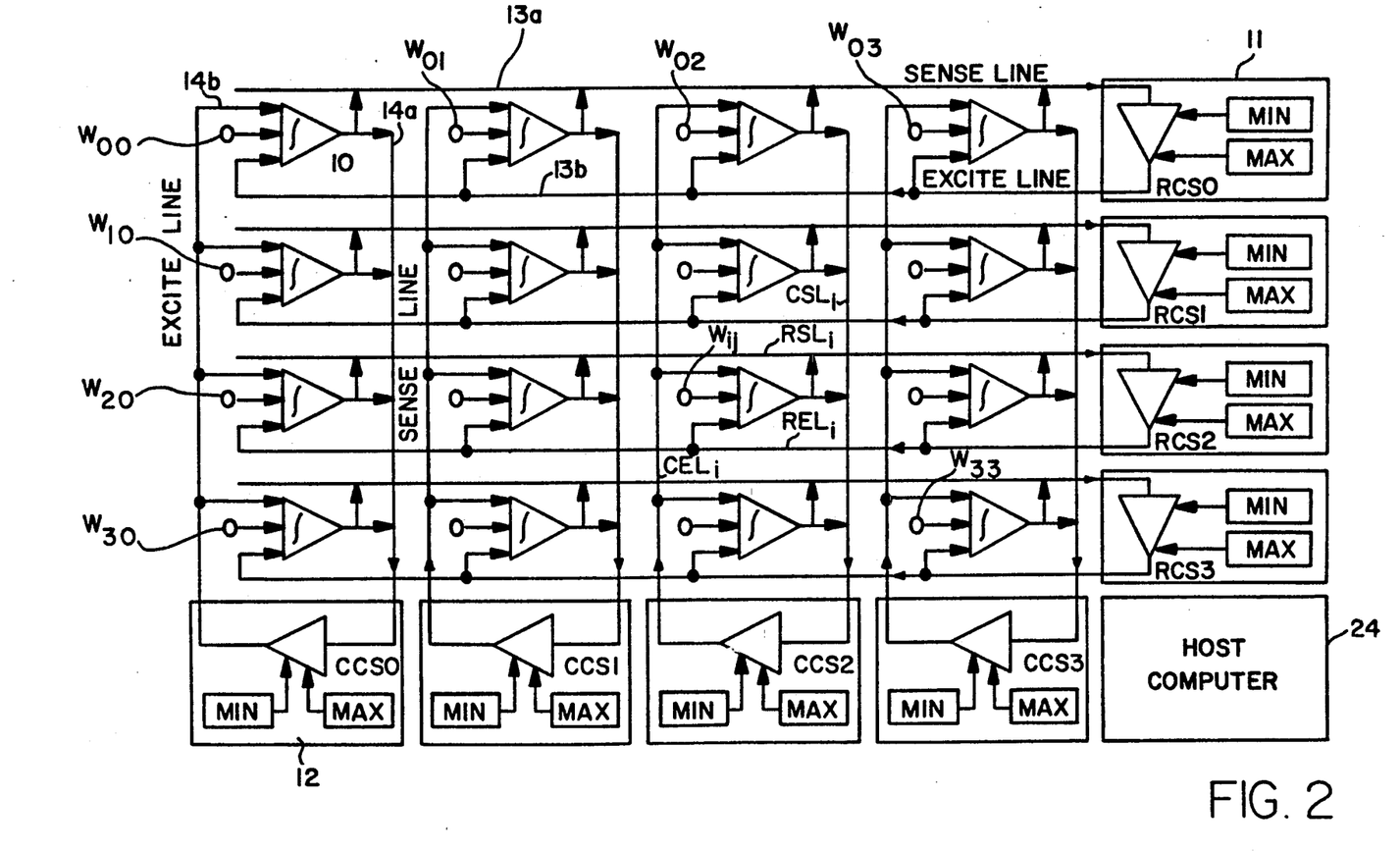
FIG. 2 illustrates schematically a neural network processor for solving linear global optimization problems in accordance with the present invention.

Referring to FIG. 2, a neural network processor for solving linear global optimization problems is comprised of a matrix of MxN processing units (PUs) 10 each of which corresponds to the pairings of M resources with N consumers or targets, either on a one-to-one, one-to-several, several-to-one, or several-to-several basis. The cost of the pairings represented by an input $W_{ij}$ at a terminal of each PU is programmed and stored in the PUs, as will be described below with reference to FIG. 3. For each row, a constraint superneuron (RCS) 11 is provided to insure that the number of active neurons within the row fall within a desired range of MIN to MAX.

For an aircraft assignment problem of scheduling airplanes (resources) to flight routes or destinations (targets), MIN=1 and MAX=1, but for other problem MIN and MAX may have different values, such as in the problem of assigning multiple weapons for each target, individually assigning each weapon equipped with multiple projectiles to multiple targets, or assigning several weapons equipped with multiple projectiles to multiple several targets. Similarly, for each column, a constraint superneuron (CCS) 12 is provided to insure that the number of active PUs within the column fall within a desired range. The row and column constraint superneurons are individually programmed with the minimum (MIN) and maximum (MAX) number of row and column PUs that may be active. As in the case of programming cost into the PUs, the MIN and MAX values programmed are individually determined and explicitly stored in the superneurons.

A computer 24 is programmed to control all parameters of each PU 10, as will be described more fully with reference to FIG. 3. If the actual number of active PUs contributing current in a sense line 13a (or 14a) connected to an input of a superneuron 11 (or 12) is outside of this range, the superneuron determines that the summed current on the sense line is too high or too low by comparison with the MIN and MAX value stored in the superneuron and increases or decreases an excitatory signal at an output terminal that is presented in parallel to the PUs of that row or column over an excite line 13b (or 14b). This will tend to activate or deactivate additional PUs in that row or column bringing the number of active PUs into compliance with the MIN, MAX range. Optionally, a global constraint superneuron (not shown) may be provided to constrain the total number of active PUs to a desired range, although in practice that may not be necessary for most applications. Also required is some means for annealing (controlling the settling) of the network which will be described with reference to FIGS. 3 and 4.

Figure 3:
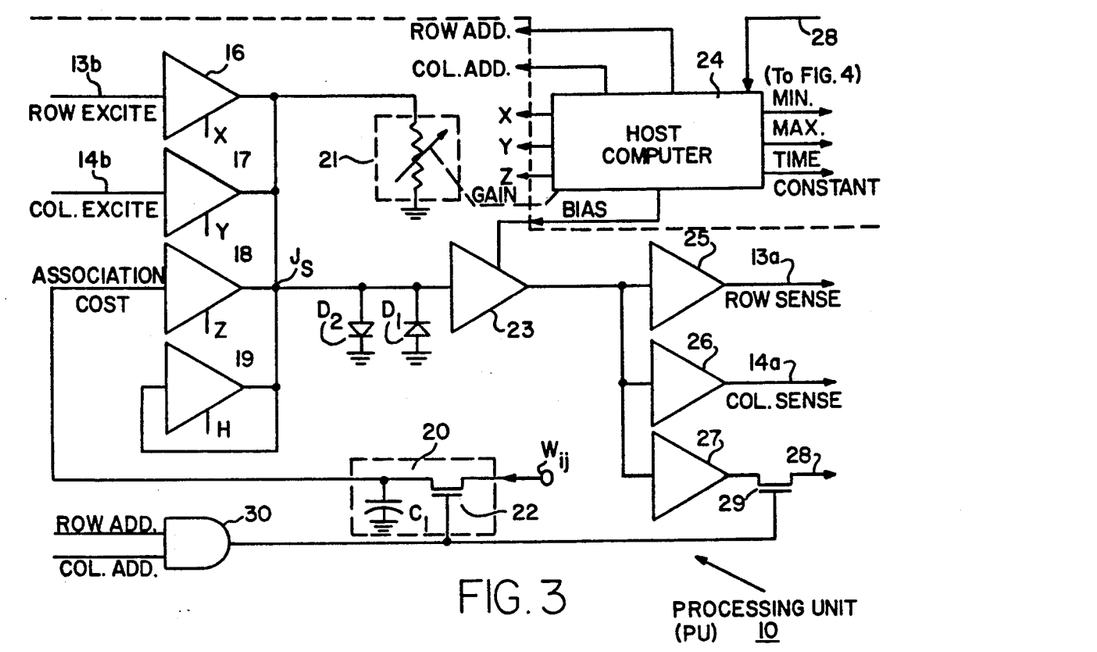
FIG. 3 illustrates a logic diagram for each processing unit i.e., (PU), i.e., neuron cell of FIG. 2.

The organization of each PU is shown schematically in FIG. 3. A summing circuit comprised of four variable gain amplifiers 16, 17, 18 and 19 connected to a current summing junction $J_s$ serves to sum the individual input signals from a cost memory 20, row superneuron 11 via row excite line 13b and column superneuron 12 via column excite line 14b. The fourth amplifier 19 applies positive feedback to the summing junction to provide some hysteresis in order to force the network to settle in an orderly manner.

This positive feedback can be used for annealing the network by gradually increasing the positive feedback to the amplifier 19, thus gradually increasing the hysteresis of the network. This is readily accomplished by gradually increasing the gain of the amplifier 19 by a programmed parameter H issued by the host computer 24 to all superneurons in parallel.

The currents summed at the junction $J_s$ flow through a transimpedance circuit 21 shown in FIG. 3 schematically as a potentiometer, but in practice implemented with active electronic elements in a circuit. The circuit 21 converts the summed current to a voltage, the excursion range of which is limited by the forward voltage drop of diodes $D_1$ and $D_2$. The level of the resulting voltage signal is converted to a unidirectional current in transconductance amplifier 23. The effective resistance of the circuit 21 is controlled by a gain control signal from the host computer 24 for all RCS and CCS superneurons only one of which is shown in FIG. 3. The variable gain circuit 21 connected to the summing junction $J_s$ may be used to achieve a variable slope sigmoidal characteristic for annealing the PUs. Thus, by increasing the variable gain as solution of the problem progresses, annealing can be provided.

The output current of the transconductance amplifier 23 is duplicated by current mirrors 25, 26 and 27. The current mirror 25 drives its current onto a row sense line 13a and the current mirror 26 drives its current onto a column sense line 14a of the matrix shown in FIG. 2. The output of the third current mirror 27 is coupled to a PU sense output line 28 by a MOS transistor gate 29. That gate and output line is used by the host computer 24 to poll each of the PUs after the solution to the problem has been reached. That is done by addressing the gate 29 for connecting the output line 28 of the PU to the host computer 24 using an addressing gate 30 so that when both row and column select terminals are activated the MOS gate transistor 29 is turned on. If the voltage signal coupled to the line 28 by the "on" transistor is zero, the PU is in an "off" state; otherwise the PU is in an "on" state. It should be noted that the addressing gate 30 is also used by the host computer during initialization to program an explicit cost factor to be stored in a memory 20 of the individual PU via a MOS transistor gate 22. The cost term $W_{ij}$ is provided as an analog signal stored in the PU using, for example, a capacitor $C_1$ as shown.

The variable gain amplifiers 16, 17, 18 and 19 are preferably implemented with MOS transistors in order to provide high input impedance. The gain control voltages X, Y, Z and H applied to the respective amplifiers 16, 17 18 and 19 set the gain factors for the activation signals on the row and column excitation lines 13b and 14b driven by row and column superneurons 11 and 12, and for the association cost $W_{ij}$ specific to each PU 10 as shown in FIG. 2. The bias voltage applied to the amplifier 19 sets the level of positive feedback to the summing junction $J_s$ in order to provide the desired hysteresis in the PU.

The host computer 24 is programmed to set those scaling bias voltages X, Y, Z and H which are applied in parallel to all the neurons. All except H are parameters that are set during an initialization period, as are the associating costs $W_{ij}$ for the separate PUs set individually. The host computer similarly sets the bias for the transconductance amplifier 23 and the gain for the transimpedance circuit 21 (represented in FIG. 3 as a dashed line) for variable gain control of the PU. In practice, that gain would be a voltage signal applied to the transimpedance circuit 21 during the initialization phase, but the gain for the transimpedance circuit 21 schematically represented in FIG. 3 as a potentiometer could be programmed by the host computer to increase as a solution to the problem progresses for annealing, as could the parameter H for increase of the positive feedback to the summing junction $J_1$. Thus, either increased gain or increased feedback, or both, may be used for annealing the network during operation for solution of a problem.

Referring to FIG. 2, it is evident that row and column excitation lines 13a and 14a serve to provide feedback from each row superneuron 11 to the Pus 10 of a related row, and from each column superneuron 12 to the PUs 10 of a related column. The row and column superneurons 11 and 12 are identical in organization and operation. Consequently, the organization of one superneuron shown in FIG. 4 applies to both. What is unique to each is the constraint window bounds, the programmed MIN and MAX number of PUs that may be on which are set during initialization of the network for a problem.

Figure 4:
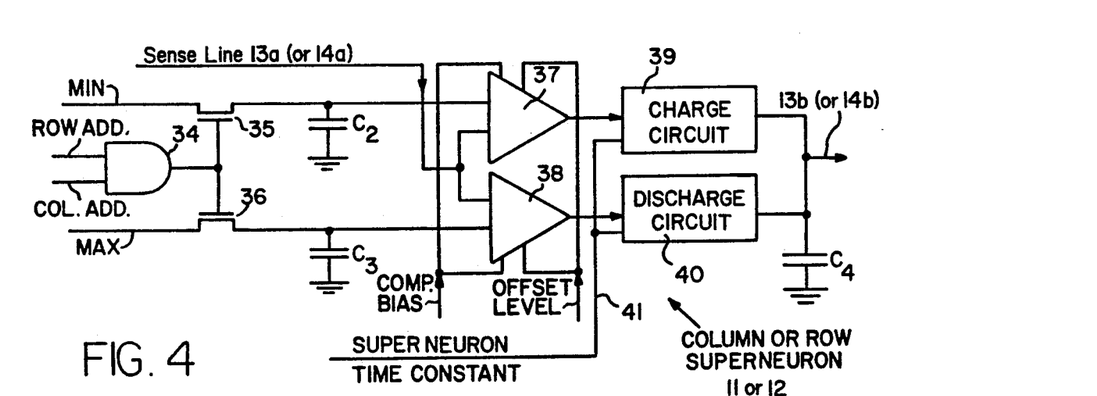
FIG. 4 illustrates schematically a logic diagram for a constraint superneuron for column and row constraint superneurons $CCS_j$ and $RCS_i$.

Referring to FIG. 4, an AND gate 34 is used to address a row superneuron 11 (or column superneuron 12) that is in the same row (or column) with which it is associated to turn on MOS transistors 35 and 36, thus enabling MIN and MAX voltages programmed by the host computer 24 (FIG. 3) to be stored on respective capacitors $C_2$ and $C_3$ during the initialization phase. Those voltages remain stored throughout the duration of the problem due to the high input impedance of MOS comparators 37 and 38. However, as in the case of storing a cost factor $W_{ij}$ in each PU, the MIN and MAX values may be entered and stored in digital form and then converted to analog form for comparison with the value of the row (or column) sense line in a superneuron 11 (or 12).

The comparators 37 and 38 compare the summation current of PUs connected to the associated row (or column) sense line 13a (or 14a) with the MIN and MAX voltage levels stored in capacitors $C_2$ and $C_3$. The comparators each have high gain and drive the charge and discharge circuits 39 and 40. These control the voltage on an output capacitor $C_4$ which provides the excitation voltage signal on a row (or column) excitation line 13b (or 14b) associated with the superneuron.

In response to the excitation voltage signal fed back from the row (or column) superneuron to the PUs, the associated row (or column) of PUs adjusts to maintain the number of PUs in the row (or column) that may be on within the specified MIN-MAX window. If the row (or column) MIN stored in capacitor $C_2$ exceeds the associated row or column current signals summed on an associated row (or column) sense line 13a (or 14a), as determined by the comparator 37, the charge circuit 39 will add charge to the capacitor $C_4$, thus increasing the voltage signal on the row (or column) excitation line 13a (or 14a) to cause more neurons in the associated row (or column) to turn on. If, on the other hand, the row (or column) current signals summed on the sense line 13a (or 14a) exceeds the MAX stored in the capacitor $C_3$, as determined by the comparator 38, the discharge circuit 40 will drain charge from the capacitor $C_4$, thus decreasing the voltage signal on the row (or column) excitation line 13b (or 14b) to cause fewer PUs in the associated row (or column) to remain on.

The row sense line 13a and the column sense line 14a will sum the currents from respective rows and columns of PUs. Consequently, it should be noted that either the current signal on the sense line must be converted to a voltage signal for comparison with the MIN and MAX signals stored in capacitors $C_2$ and $C_3$, or the MIN and MAX signals must be converted to proportional current signals for comparison with the current signal on the sense line. The CMOS circuit diagram of the superneuron shown in FIG. 6 effectively converts the MIN and MAX voltage to current and compares currents.

It is desirable to control the charge-discharge time constant of the capacitor (i.e., the rate at which current will flow through the circuits 39 and 40 to or from the capacitor $C_4$). That is set by the host computer 24 (FIG. 2) via a line 41 for the optimum speed of operation in solving global optimization problems of resource allocation. While speed may always be desired, a longer time constant in the feedback to the PUs may be required in order to avoid having the PU network oscillate about the final solution before it settles, or settles to a poor solution. This is distinct from the need for annealing which requires increasing the annealing factor as solution of the problem progresses. Consequently, the time constant is set during initialization of the network and stored in the host computer 24.

An analog VLSI implementation of the neuron network processor of FIG. 2, organized as shown in FIGS. 3 and 4, will now be described, first with reference to FIG. 5 for a CMOS circuit that implements a single PU 10 shown in FIG. 3 for the neuron network processor, and then with reference to FIG. 6 for a CMOS circuit that implements a single superneuron 11 (or 12) shown in FIG. 4. Each superneuron provides and enforces constraints in matching resources to expenditures (consumers) in each row and column. Both the PU circuit of FIG. 5 and the superneuron circuit of FIG. 6 have been designed and fabricated using a 2 μm n-well CMOS technology. For the convenience of associating the CMOS circuit diagrams of FIGS. 5 and 6 with the organization diagrams of FIGS. 3 and 4, the same reference numerals employed in FIGS. 3 and 4 are used in FIGS. 5 and 6 to refer to sections of active MOS transistor elements that are interconnected to provide the required functions described above.

Figure 5:
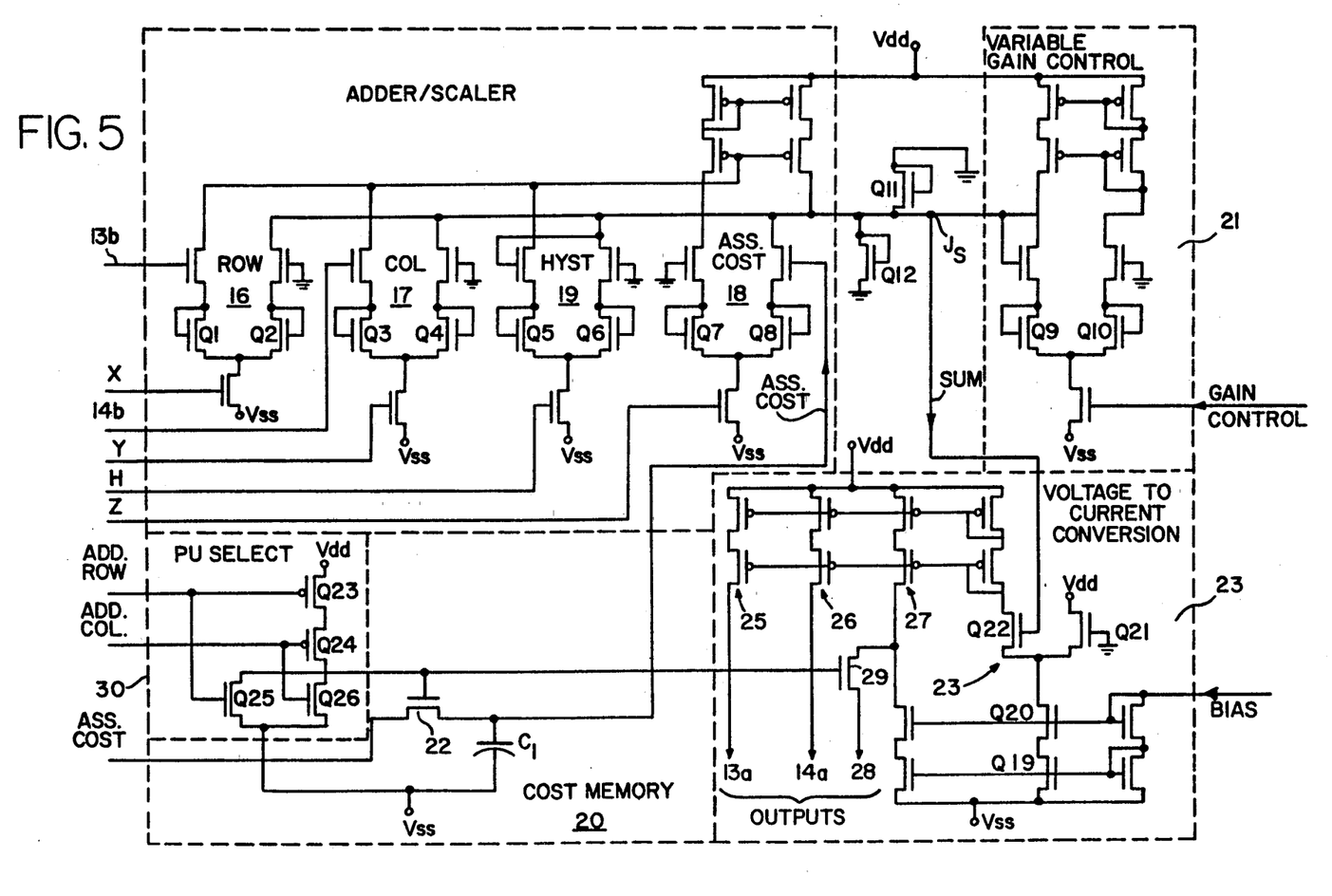
FIGS. 5 and 6 illustrate CMOS circuits for implementing the logic diagrams shown in FIGS. 3 and 4.
Figure 6:
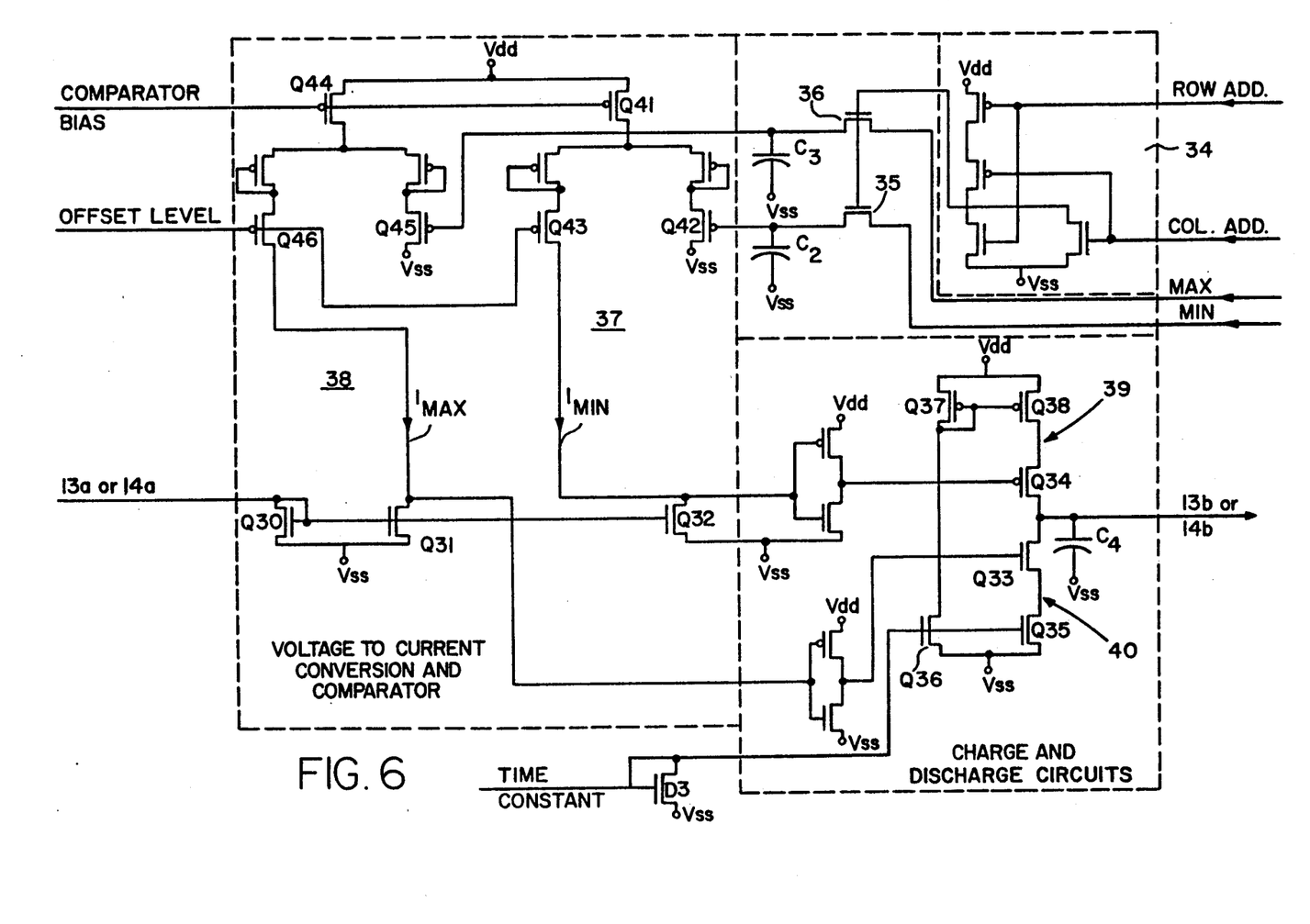

Referring to FIG. 5, the adder/scaler network described with reference to elements 16 through 19 and 21 has been implemented as an extension of the differential difference amplifier described by E. Saeckinger and W. Guggenbuehl, "A versatile building block: The CMOS differential difference amplifier," IEEE J. Solid-State Circuits, SC-22, No. 2, 287-294, April 1987, to include four sections 16, 17, 18 and 19 connected to junction $J_s$ for summing inputs from the row and column excitation lines 13b and 14b with the cost $W_{ij}$ from capacitor $C_1$. An addressing circuit 30 responds to row and column address signals to enable transistor 22 to conduct a cost signal $W_{ij}$ into the capacitor $C_1$. That transistor and capacitor together function as the cost memory (sample-and-hold section) 20. Diode-connected source transistors $Q_1$ through $Q_8$ are used to reduce the gain of the differential difference amplifiers 16 through 19. Transistors $Q_9$ and $Q_{10}$ are similarly used in the variable gain control transimpedance circuit 21. The summing junction $J_s$ is clamped by source transistors $Q_{11}$ and $Q_{12}$ diode-connected to function as clamping diodes $D_1$ and $D_2$ at the input to the variable gain transimpedance circuit 21 which electronically varies gain in response to a gain control input signal.

The level of the output signal at junction $J_s$ is shifted in the transconductance amplifier 23 to a desired level in response to a bias signal applied to the amplifier 23 comprising MOS transistors $Q_{19}$, $Q_{20}$, $Q_{21}$ and $Q_{22}$. The current output of MOS transistor $Q_{22}$ is reflected by MOS current mirrors 25, 26 and 27 onto output lines. The output lines of the current mirrors 25 and 26 are connected directly to row and column sense lines 13a and 14a. The output of the current mirror 27 is connected to a PU sense output line 28 by the MOS transistor 29 addressed through AND gate 30 comprised of MOS transistors $Q_{23}$ through $Q_{26}$ arranged in a NOR logic configuration which requires both the row and column select signals to be at a zero Boolean logic level to enable the transistor 29 to conduct, thus providing a logic AND function in addressing the transistor 29. As noted with reference to FIG. 3, the addressing gate 30 also enables MOS transistor 22 in the cost memory 20 in order that the capacitor $C_1$ may receive and store a cost input voltage signal $W_{ij}$.

It should be noted that all MOS transistors in FIG. 5 are of the NMOS type except those shown with a small circle at the gate which is a conventional way in CMOS technology of indicating that those MOS transistors are of the PMOS type. That convention is also used in FIG. 6 which illustrates the CMOS circuit used for the row and column constraint superneurons (RCS and CCS). Row and column address gate 34 is implemented as a NOR gate with MOS transistors as is the gate 30 in the PU circuit of FIG. 5 It enables MOS transistors 35 and 36 to store MAX and MIN voltages (the constraint window bounds) in capacitors $C_2$ and $C_3$. A row or column PU sense signal on line 13a (or 14a) is compared with the window bounds in comparators 37 and 38. The activation signal on the sense line 13a (or 14a) is first applied to MOS transistor $Q_{30}$ connected as a diode in order to sink current. The voltage on the gate of the transistor $Q_{30}$ is also applied to the gate of transistors $Q_{31}$ and $Q_{32}$ which duplicate the row or column activation current signal. As a consequence, comparators 37 and 38 compare the summation current on the sense line 13a (or 14a) from row (or column) PUs mirrored by transistors $Q_{31}$ and $Q_{32}$ with currents generated by differential amplifiers of the comparators 37 and 38 comprised of MOS transistors $Q_{41}$, $Q_{42}$, $Q_{43}$ and transistors $Q_{44}$, $Q_{45}$, $Q_{46}$ that convert the voltages stored in the capacitors $C_2$ and $C_3$ into $I_{MIN}$ and $I_{MAX}$ currents.

The range of MIN and MAX currents may be set by adjusting the gate voltage of transistors $Q_{42}$ and $Q_{43}$ of comparator 37 and transistors $Q_{45}$ and $Q_{46}$ of comparator 38. The sense line current mirrored by MOS transistors $Q_{31}$ and $Q_{32}$ are subtracted from $I_{MAX}$ and $I_{MIN}$, and the resulting currents are converted to voltages applied to the gates of transistors $Q_{34}$ and $Q_{33}$ of charge and discharge circuits 39 and 40. The overall result is that the activation level of the PUs on sense line 13a (or 14a) is compared with $I_{MAX}$ and $I_{MIN}$. If the PU activation level is higher than $I_{MAX}$, transistor $Q_{33}$ is turned on and capacitor $C_4$ is discharged until the PU activation decreases to a level equal to $I_{MAX}$. Similarly, if the PU activation level is less than $I_{MIN}$, transistor $Q_{34}$ is turned on to charge the capacitor $C_4$ to increase neuron activation to a level equal to $I_{MIN}$. If the neuron activation level is within the window between and $I_{MIN}$ and $I_{MAX}$, neither of the transistors $Q_{34}$ and $Q_{33}$ in the charge and discharge circuits 39 and 40 is turned on, and the charge stored in the capacitor $C_4$ remains unchanged.

Initially, the capacitor $C_4$ is uncharged at the commencement of problem solution and so transistor $Q_{34}$ will be turned on to charge the capacitor $C_4$, thus allowing additional PUs to be turned on. As PUs turn on and off while searching for a solution, the number of PUs turned on will increase until $I_{MIN}$ is exceeded. The charge on the capacitor $C_4$ will then remain constant. If so many PUs are turned on that $I_{MAX}$ is exceeded, transistor $Q_{33}$ is turned on to discharge the capacitor $C_4$. This "hunting" will continue until the PU network reaches a stable condition which is a solution to the problem. In order to avoid oscillations, the superneuron time constant is made larger than the PU time constant by a superneuron time-constant control signal applied to a MOS transistor connected as a diode $D_3$ to sink current. This provides a time constant control voltage signal to the gates of transistors $Q_{35}$ and $Q_{36}$ to control the discharge rate of the capacitor $C_4$. The time-constant signal applied to transistor $Q_{36}$ is mirrored to transistor $Q_{37}$ to set the charge rate by setting the conduction level of transistor $Q_{38}$. In that manner, the conduction level of transistors $Q_{35}$ and $Q_{38}$ determine the rate of change in the charge level of capacitor $C_4$.

Figure 7:
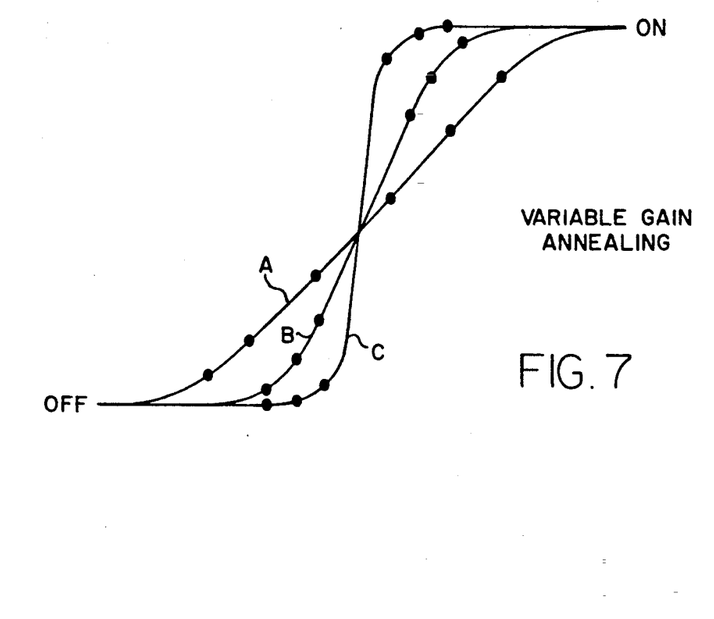
FIG. 7 illustrates sigmoid characteristic gain curves A, B and C programmed by a host computer for annealing the PUs.

As noted hereinbefore with reference to FIGS. 3 and 5, the host computer 24 shown in FIG. 3 controls gain of the PUs at the variable gain control element 21. This may be used for annealing by gradually increasing PU gain until PUs turn on or off, a condition of the PU network that is stable. This variable gain annealing technique is illustrated by the sigmoid characteristic curves A, B and C shown in FIG. 7. As the gain is increased, the sigmoid shape of the curve A becomes more pronounced as shown by the curves B and C, and the slope of the curves in the central portion increases. As a result, the distribution of PUs at levels between ON and OFF begins to clearly separate between those that are more conductive from those that are less conductive by driving those more conductive toward saturation and driving those less conductive toward cutoff until finally they become fully segregated with some on at saturation and others completely off. This is the classic annealing method for neural networks of the prior art.

Figure 8:
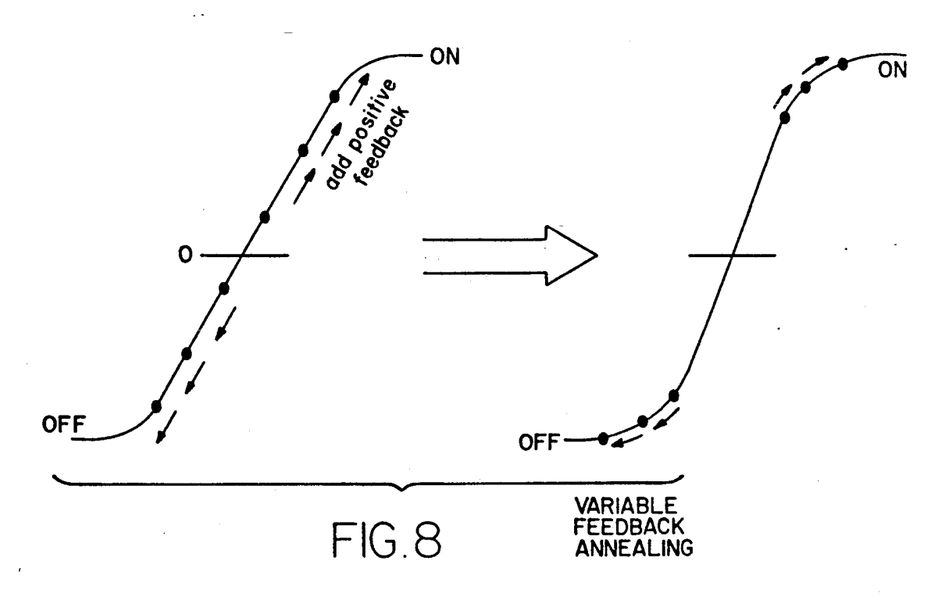
FIG. 8 illustrates a single sigmoid gain curve and the effect of increasing positive feedback in each PU to gradually increase hysteresis and thus provide a new method of annealing in the PU network.

An alternative annealing method is to provide positive feedback in each PU and gradually increase the feedback, thereby gradually increasing the hysteresis of the PU. This method is illustrated in FIG. 8 by a single sigmoid curve with levels of PU conduction distributed between the extremes of ON and OFF. As positive feedback is increased, those at a level of conduction above a midpoint will begin to move closer to saturation, and those below will begin to move closer to shutoff, until finally those above are on fully and those below are completely off. As a result, the segregation of PUs between ON and OFF is more quickly and positively achieved. This new hysteresis annealing method is preferred for the neural-network dedicated processor disclosed over the prior-art gain method referred to above, or in combination with the prior-art gain method, in which case the slope of the sigmoid curve of FIG. 8 is increased as feedback (hysteresis) of the PUs is increased.

To illustrate the manner in which the invention is to be used, a situation is shown in which 70 scattered retail stores are to be supplied by 20 warehouses among them, and each warehouse can supply to 3 or 4 stores. To map this problem onto the neural-network dedicated processor, the warehouses and stores are numbered, each warehouse is mapped onto one PU row, and each store is mapped onto a PU column. The weights are given by the distances between the stores and warehouses. If each volt programmed into the memory corresponded to 10 miles of distance, and store 1 was 4.6 miles from warehouse 1, then the weight programmed into PU (1,1) would be 0.46 volts. The weight would be downloaded by applying the appropriate digital select signals such that PU (1,1) is selected, and a digital-to-analog converter in the host computer's backplane would be used to generate the 0.46 volt level that would be applied to the COST terminal.

In this simple case, 20 rows and 70 columns would be used out of possibly 50 rows and 100 columns. The unused rows and columns are deactivated by programming MIN=MAX=0 levels into the superneurons of those unused rows and columns. The superneurons for the rows that are used are programmed with MIN=3 and MAX=4 since each warehouse can supply from 3 to 4 stores. Superneurons for used columns are programmed with MIN=1 and MAX=1 since each store is to be supplied by only one warehouse. Note that conversion factors must be experimentally measured that give the voltage levels corresponding to MIN or MAX thresholds of 1, 3 and 4.

In addition, the gain control is set initially so as to give a shallow sigmoid slope. After these values have been programmed, the network will settle into a state such that all PUs are partially on, with activation corresponding generally to the inverse of the cost, but also influences by the row and column superneurons. At this point, annealing is applied by slowly increasing the sigmoid gain and/or the PU positive feedback (hysteresis). This forces all PUs to approach over time a fully-on or fully-off state. While annealing is proceeding with a slow time constant, the superneurons, with a faster time constant, are changing their activations to insure that blocking constraints remain satisfied (i.e., 3 or 4 stores are serviced by each warehouse, and each store is services by only one warehouse). After annealing has proceeded to the point where only some of the PUs are fully on, the rest are off, and the pattern of on and off PUs is stable, a solution has been generated. The host computer then accesses each PU in turn by activating its output gate transistor 29 and noting the PU state. This gives the assignment matrix X directly.

From this illustration of an assignment, it is evident how virtually any assignment problem may be mapped, given:

1) Two sets $\{R_i; 1<i<M\}$ and $\{C_j; 1<j<N\}$ (e.g., warehouses and retailers) whose elements are to be assigned to each other.

2) An NxM assignment cost matrix ($W_{ij}$) giving the cost of pairing any $R_i$ to any $C_j$.

3) Blocking constraints that specify the number of C elements that may be paired with any $R_i$, and the number of R elements that may be paired with any $C_j$.

4) A binary assignment matrix $X=\{x_{ij}\}$, where $x_{ij}=1$ if $R_i$ is associated with $C_j$ and $x_{ij}=0$ otherwise.

The present invention gives an assignment matrix X that minimizes Equation (1).

A neural-network architecture has been described that is capable of solving first-order assignment problems larger than 64×64 in size. By reducing connectivity to the same order as number of processing units (neurons), the architecture is amendable to hardware implementation. Blocking constraints may be independently set for each element to be one-to-one, one-to-several, or even a range of several-to-several acceptable pairings. This degree of flexibility is unmatched by any other algorithm for assignment. The novel method of "hysteretic annealing," implemented by increasing over time the levels of positive feedback within processing units, guarantees system convergence and a maximum convergence time. The tradeoff between settling time and goodness of solution may be explicitly programmed. Simulations have shown that the system can be expected to settle in time scales of tens or hundreds of microseconds—orders of magnitude faster than other methods that can guarantee a good or optimal solution.

Although a particular embodiment of the invention has been illustrated and described with some modifications and equivalents for storing $W_{ij}$, MIN and MAX values in digital form in the network that is otherwise implemented as an analog neural-network processor, it is recognized that other modifications and equivalents may readily occur to those skilled in the art. Consequently, it is intended that the claims be interpreted to cover such modifications and equivalents.

I claim:

1. A neural-network dedicated processor for solving first-order assignment problems by allocating a matrix of NxM processing units, wherein assignment is of one or several elements of a first set $\{R_i\}$ of elements which correspond to one of N rows in said matrix, to one or several elements of a second set $\{C_j\}$ which corresponds to one of M columns in said matrix, each processing unit $PU_{ij}$ at an intersection ij of a set $\{R_i\}$ in a row and of a set $\{C_j\}$ in a column having an output current conducting line connected to a row sense line $RSL_i$ and a column sense line $CSL_j$, a first input terminal connected to a row excitation line $REL_i$ and a column excitation line $CEL_j$ and a unit output terminal, each of said processing units corresponding to the pairing of one of said first set of elements $\{R_i\}$ with one of said second set of elements $\{C_j\}$, means for initially programming a separate weight of said pairing into each of said processing units as a cost factor $W_{ij}$, a set $\{RCS_i\}$ of N row control superneurons associated with said N rows of processing units, each row control superneuron having an input terminal and an output terminal, a set $\{CCS_j\}$ of M column control superneurons associated with said M columns of processing units, each column control superneuron having an input terminal and an output terminal, and means for initially programming a separate minimum and maximum number of processing units of the first set {$R_i$} that may be conducting a current onto said row sense line $RSL_i$, and initially programming a separate minimum and maximum number of processing units of the second set {$C_j$} that may be conducting a current onto said column sense line $CSL_j$, each row sense line $RSL_i$ connected to sum output currents of each processing unit in row i being connected to said input terminal of a row control superneuron associated with row i, and each column sense line $CSL_j$ connected to sum output currents of each processing unit in a column j connected to said input terminal of a column control superneuron associated with column j, each row control superneuron having said output terminal connected to each processing unit of an associated row of units through a row excitation line for voltage feedback, and each column control superneuron having said output terminal connected to each processing unit of an associated column of units through a column excitation line for voltage feedback, means within each processing unit $PU_{ij}$ for summing excitation signals on said row and column excitation lines which are connected thereto with a signal representing said programmed cost factor $W_{ij}$, means for coupling said summing means within each processing unit $PU_{ij}$ onto a row sense line $RSL_i$, a column sense line $CSL_j$, and said output terminal of said processing unit $PU_{ij}$, and means for probing said unit output terminal of each processing unit $PU_{ij}$ to determine which processing units are conducting current onto associated row and column sense lines, thereby to determine the solution of said problem after all processing units have been driven to a stable pattern of conducting and not conducting a current onto said row and column sense lines.

2. A neural-network dedicated processor for solving first-order assignment problems as defined in claim 1 wherein said means for coupling said summing means onto a row sense line, a column sense line, and said unit output terminal includes positive feedback control means and means for programming said positive feedback control means for an increase of said positive feedback while solving a first-order assignment problem, thereby annealing said neural-network dedicated processor to force it toward said solution.

3. A neural-network dedicated processor for solving first-order assignment problems as defined in claim 2 wherein said means for coupling said summing means onto a row sense line, a column sense line, and said unit output terminal includes gain control means and means for programming said gain control means for an increase of said gain while said positive feedback is increased for more rapid annealing of said neural-network dedicated processor.

4. A neural-network dedicated processor as defined in claim 1 wherein said means for programming a separately specified cost factor $W_{ij}$ for each processing unit is comprised of a separate logic gate in each processing unit responsive to an address line i and an address line j, where lines i and j are associated with a row and a column of processing units that intersect at each processing unit addressed, means for storing said separately specified cost factor in each processing unit, and a sampling gate responsive to said logic gate for coupling said weight factor $W_{ij}$ into said storage means.

5. A neural-network dedicated processor as defined in claim 4 wherein said means for probing said output terminal of each processing unit is comprised of a sampling gate responsive to said separate logic gate in each processing unit responsive to said address line i and said address line j.

6. A neural-network dedicated processor as defined in claim 1 including means for initially specifying said number of said first set of elements {$R_i$} paired with said number of said second set of elements {$C_i$} by programming into each row control superneuron a minimum and a maximum number of processing units of row i that may be in a condition to conduct current onto a sense line $RSL_i$ and programming into each column control superneuron a minimum and a maximum number of processing units in column j that may be in a condition to conduct current onto a sense line $CSL_j$, said specifying means comprising a minimum-number storage means and a minimum-coupling gate for coupling a voltage signal representing said minimum number into said storage means, a maximum-number storage means and a maximum-coupling gate for coupling a voltage signal representing said maximum number into said storage means, and a logic gate responsive to an address line i and an address line j, where lines i and j are associated with a row and column of processing units for selecting said minimum-number and maximum-number storage means, said logic gate being connected to enable said minimum-coupling and maximum-coupling gates to couple minimum- and maximum-number voltage signals to said respective minimum-number and maximum-number storage means, wherein each row superneuron i includes means for comparing a signal on said row sense line $RSL_i$ with said minimum-number and said maximum-number voltage signals, and means for adjusting a signal on said row excitation line $REL_i$ by increasing said signal if below said stored minimum-number voltage and decreasing it if above said stored maximum-number voltage, and wherein each column superneuron j includes means for comparing a signal on said column sense line $CSL_j$ with said minimum and maximum, and means for adjusting a signal on said column excitation line $CEL_j$ by increasing said signal if below said stored minimum-number voltage and decreasing said signal if above said stored maximum-number voltage.

7. A neural-network dedicated processor as defined in claim 6, including means for comparing a sense line signal with a minimum-number and a maximum-number signal, wherein said means for adjusting a signal on said row and column excitation lines in respective row and column superneurons is comprised of means for storing an output excitation signal level and separate increase and decrease means responsive to said means for comparing a sense line signal with a minimum-number and a maximum-number voltage signals, respectively, for increasing and decreasing said output signal level in said storage means, thereby to adjust a row or column excitation signal to be between said minimum-number and said maximum-number.

8. A neural-network dedicated processor as defined in claim 7 wherein said means for storing an output excitation signal level is comprised of a storage capacitor, and said separate increase and decrease means are comprised of a charge circuit and discharge circuit, respectively, and said charge circuit and said discharge circuit of each superneuron includes means responsive to a programmed signal specifying a rate of change of said charge and discharge circuits, thereby to specify the rate at which said storage capacitor charges or discharges to adjust said excitation line to be between said minimum -number and said maximum -number voltages.

9. In a neural network having a matrix of processing units and means within each processing unit for summing excitation signals, a programmable positive feedback circuit connected to said summing means within each processing unit, and means for programming an increase in positive feedback in all said processing units in unison, whereby annealing said neural network is achieved as operation progresses toward a stable state in which each processing unit is either driven to conduct at saturation or driven to be nonconducting.

10. In a neural network as defined in claim 9, including a programmable gain control means connected to said summing means for programming an increase in gain in all said processing units in unison, whereby more rapid annealing of said neural network may be achieved.

* * * * *